2 Sheets--Sheet 1.

S. A. HATHAWAY.
Thill-Coupling.

No. 166,697.   Patented Aug. 17, 1875.

Witnesses:
Millard Farr.
Edw. Payson

Inventor:
Samuel A. Hathaway
Per Geo. W. Miatt
Attorney.

S. A. HATHAWAY.
Thill-Coupling.
No. 166,697.
2 Sheets--Sheet 2.
Patented Aug. 17, 1875.
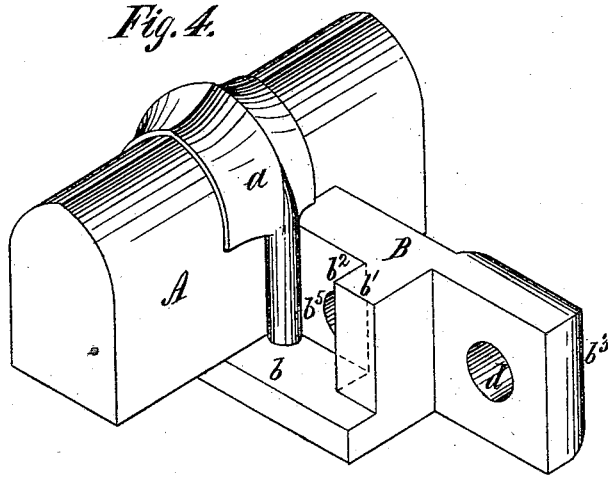
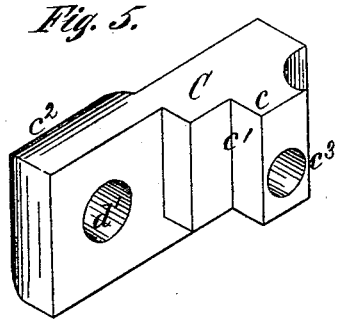
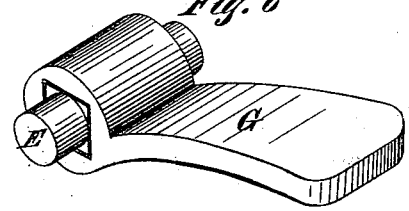
Witnesses:
Millard Fass
Edw'd Payton
Inventor:
Samuel A. Hathaway
Per Geo. W. Miatt
Attorney.

UNITED STATES PATENT OFFICE.

SAMUEL A. HATHAWAY, OF NORWALK, CONNECTICUT, ASSIGNOR OF ONE-HALF HIS RIGHT TO GEORGE H. STEDWELL, OF NEW YORK, N. Y.

IMPROVEMENT IN THILL-COUPLINGS.

Specification forming part of Letters Patent No. 166,697, dated August 17, 1875; application filed June 21, 1875.

*To all whom it may concern:*

Be it known that I, SAMUEL A. HATHAWAY, of the city of Norwalk, county of Fairfield and State of Connecticut, have invented certain Improvements in Thill-Couplings for Vehicles, of which the following is a specification:

My invention relates to devices for securing the thills to the axle-tree of a vehicle, in which a bolt and nut are employed to secure the parts together; and consists in the special arrangement and construction shown and described, in which the bolt that secures the thill is passed through two shouldered cheek-pieces, (one secured to the axle-tree and the other removable,) in each of which is formed a socket for the reception of opposite ends of a pivot that passes through the strap or eye which is secured to the end of the thill, in contradistinction to the old method, in which the bolt is passed directly through the strap or eye on the end of the thill, in which latter case the strain and working of the thill is directly upon the bolt, which renders the nut liable to work loose, and even to work off the bolt, and thus allow the bolt to escape from position, and let the end of the thill fall, all danger of which is obviated in my device, since the metal strap or eye secured to the end of the thill works upon and is supported by an independent pivot, and there is no play or direct strain upon the bolt whatever. The fastening is thus rendered more safe and durable, and the necessity for using rubber cushions to counteract rattling and noise is avoided, as hereinafter described.

Figure 1:
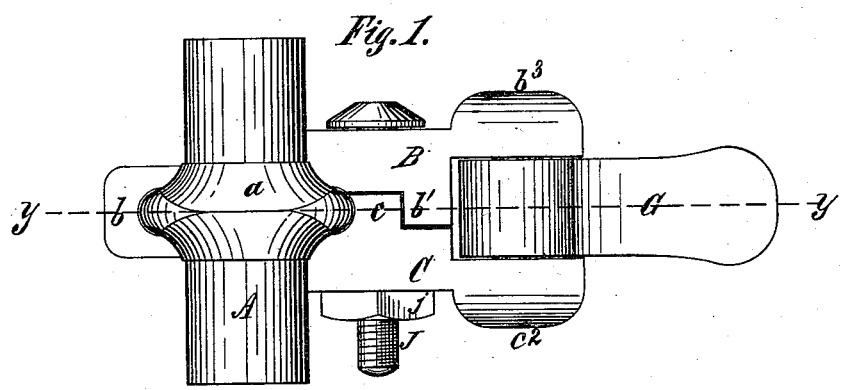
Figure 2:
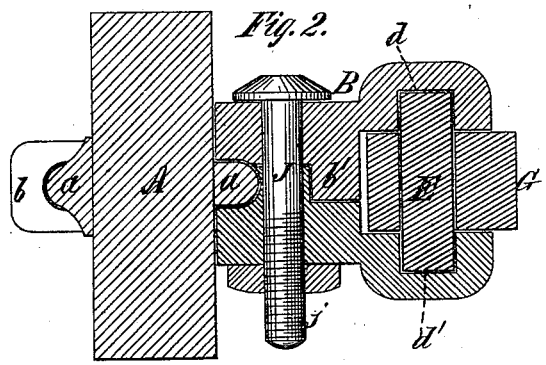
Figure 3:
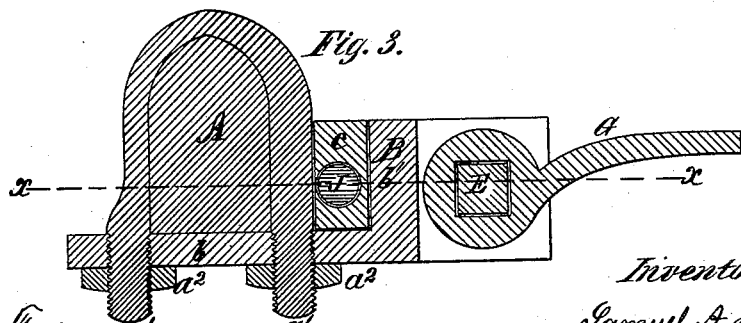

In the accompanying drawings, Figure 1 is a plan of my device, as secured to the axle-tree of a vehicle; Fig. 2, a horizontal section of the same in plane of line $x\,x$, Fig. 3; Fig. 3, a vertical horizontal section in plane of line $y\,y$, Fig. 1; and Figs. 4, 5, and 6, respectively, perspective views of the several parts of my device separated.

In the drawings my improved coupling is shown as applied to a section of the axle-tree A of a vehicle by means of the strap $a$ astride the axle-tree, having threaded ends $a^1\,a^1$, which pass through the base or flange $b$ of the stationary cheek-piece B, and are secured by nuts $a^2\,a^2$, thereby holding the flange $b$ firmly against the bottom of the axle-tree. The flange $b$ supports and is formed with the cheek-piece B, having a shoulder, $b^1$, and jam $b^2$. The removable cheek-piece C is formed with a shoulder, $c$, which coincides with and fits into the jam $b^2$ of the stationary cheek-piece B, while the shoulder $b^1$ of the latter rests in the jam $c^1$. Both of the cheek-pieces are provided with sockets $d\,d'$, formed in the cheeks $b^3\,c^2$ for the reception of the opposite ends of the pivot E, which passes through the eye piece or strap G that is secured to the end of the thill. The body of this pivot E is made square, so as to fit closely the square hole in the strap or eye-piece G; but its ends are cylindrical to fit the sockets $d\,d'$ in the cheeks $b^3\,c^2$.

If preferred the removable pivot E may be dispensed with by forming journals upon the strap G attached to the thill, which shall fit into the sockets $d\,d'$ when the parts are secured together.

It will be perceived that the ends of the pivot E are inclosed and protected by the cheeks $b^3\,c^2$, and by using a pivot with a square body fitting into a correspondingly-shaped eye attached to the thill, I avoid the excessive wear and rattling of parts consequent to the old method of coupling without using rubber or other pads for the purpose.

The bolt J is passed through holes $b^5\,b^3$, formed for it in both cheek-pieces, and is secured by the nut $j$.

In order to couple or uncouple the thill the nut $j$ is loosened, and the removable cheek-piece C drawn away from the stationary cheek-piece B a sufficient distance to allow the insertion or withdrawal of the ends of the pivot E into or from the sockets $d\,d'$ in the cheeks.

It will be seen that the shoulders $b^1\,c$ are interposed between the pivot E and the bolt J, so as to relieve and protect the bolt from all strain and wear occasioned by the thill. For this reason also the bolt may be at any time readily and quickly withdrawn, whereas in the old method of coupling in which the thill is supported directly by the bolt it is a difficult and tedious operation.

What I claim as my invention is—

The thill-coupling herein shown and described, consisting of the stationary cheek-piece B attached to the axle-tree, and formed with shoulder $b^1$, jam $b^2$, and socket $d$, and the removable cheek-piece C, provided with shoulder $c$, jam $c^1$, socket $d'$, said cheek-pieces being secured together by the bolt J, in combination with the thill-strap or eye-piece G and pivot E, arranged and operating substantially in the manner and for the purpose herein set forth.

SAMUEL A. HATHAWAY.

Witnesses:
W. S. PINCKNEY,
WM. H. DEWOLF.